United States Patent [19]
Uesugi et al.

[11] Patent Number: 5,286,802
[45] Date of Patent: * Feb. 15, 1994

[54] INJECTION COMPACTING COMPOSITION FOR PREPARING SINTERED BODY OF METAL POWDER AND SINTERED BODY PREPARED THEREFROM

[75] Inventors: Norimasa Uesugi, Kyoto; Hirokazu Kato, Jyoyo; Katuyoshi Saitoh, Kyoto, all of Japan

[73] Assignees: Dai-ichi Ceramo Co., Limited, Kanzaki; Dai-ichi Kogyo Seiyaku Co., Ltd., Kyoto, both of Japan

[*] Notice: The portion of the term of this patent subsequent to Jan. 11, 2011 has been disclaimed.

[21] Appl. No.: 693,471

[22] Filed: Apr. 30, 1991

Related U.S. Application Data

[63] Continuation-in-part of Ser. No. 677,928, Apr. 1, 1991.

[51] Int. Cl.$^5$ .......................................... C08F 265/04
[52] U.S. Cl. ..................... 525/309; 525/67; 525/70; 524/504
[58] Field of Search ................ 525/309, 67, 70; 524/504

[56] References Cited

U.S. PATENT DOCUMENTS 4,000,110 12/1976 Saito et al. ..................... 524/584
4,492,783 1/1985 Tanaka et al. ................... 524/430

FOREIGN PATENT DOCUMENTS 0296552 12/1988 European Pat. Off. .
229403 12/1984 Japan .

OTHER PUBLICATIONS

Derwent Abstract of JP 890127706 Japanese Publication No. 91-039577 (Dec. 19, 1990).

Primary Examiner—John Kight, III
Assistant Examiner—Duc Truong
Attorney, Agent, or Firm—Varndell Legal Group

[57] ABSTRACT

An injection compacting composition suitable for preparing sintered bodies of metal powders, which can provide, by injection compacting, compacts having a high strength from which the binder can be removed without causing deformation, cracking and other defects, thus providing sintered metallic materials having a high density and no defects such as warpage and cracks in high yields, which comprises (1) a metal powder and (2) an organic binder comprising a composite acrylic polymer and an atactic polypropylene, said composite acrylic polymer being a suspension polymerization product prepared by dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer, dispersing the resulting solution in an aqueous medium in the presence of a dispersing agent, and subjecting the resulting dispersion to a suspension polymerization.

9 Claims, 6 Drawing Sheets

INJECTION COMPACTING COMPOSITION FOR PREPARING SINTERED BODY OF METAL POWDER AND SINTERED BODY PREPARED THEREFROM

CROSS-REFERENCE TO RELATED APPLICATION

This is a continuation-in-part of application Ser. No. 07/677,928 filed on Apr. 1, 1991 pending.

BACKGROUND OF THE INVENTION

The present invention relates to an injection compacting composition for preparing sintered bodies of metallic powders which comprises a metallic powder and a specific organic binder. More particularly, the present invention relates to the injection compacting composition which has a good injection compatibility and shows a high shape retainability of compacts prepared therefrom without deformation when removing the binder from the compacts, and which can provide sintered bodies having no or little defects such as warpage and cracks and having a high density in high yields, and also relates to sintered bodies prepared therefrom and a process for the preparation of the sintered bodies.

Sintered bodies have been prepared by compacting a mixture of an inorganic powder with an organic binder and sintering the resulting compacts. In recent years, in the field of ceramics, ceramic products have been prepared by mixing a ceramic powder and an organic binder, imparting a plasticity to the mixture, injection-compacting the mixture to give green compacts, removing the binder from the compacts and sintering the compacts. The production of sintered ceramic products by injection molding has the features that parts of complicated shape which cannot be produced by press molding, can be mass-produced industrially.

On the other hand, in the field of metallic sintered bodies, they have been prepared for a long time by so-called powder metallurgy method, namely by mixing a metal powder with a slight amount of an organic substance as a binder, compacting the mixture by press molding, and sintering the compacts. In recent years, in order to mass-produce sintered metallic materials of complicated shape having a high density, it has been attempted to apply the injection compacting method which has been used for the production of ceramic articles, to the production of sintered metallic materials.

However, in the production of sintered metallic materials, for the reasons that (1) metal powders have a relatively large particle size, whereas ceramic powders have an average particle size as fine as below 3 $\mu$m, (2) metal powders used as raw materials for the production of sintered metallic materials have in general a higher specific gravity than usual ceramic powders such as alumina powder, and (3) metal powders are poor in wettability with binders as compared with usual ceramic powders, for example, oxide ceramic powders such as alumina, even if it is tried to produce sintered metallic materials under similar conditions to those in the production of ceramics, problems are encountered, e.g. poor injection compatibility, lack of strength of green compacts and deformation of compacts in removal of the binder. Accordingly, it has been difficult to produce good sintered metallic materials as in the case of the production of ceramic products, and at times even green compacts cannot be satisfactorily prepared.

In order to solve such problems, attempts to remove the binder by a special method or under special conditions have been made, but satisfactory results have not been necessarily obtained.

Removal of the binder from compacts prepared by compacting a mixture of a metal powder and the binder by thermal decomposition has been generally conducted by embedding the compacts in a powder unreactive to the compacts, e.g. alumina or zirconia, whereby seeping out of the binder by capillary action is accelerated to shorten the time required for binder removal, and the shape retainability of compacts is raised. However, the removal of binder by such a method requires a wider space due to the use of powder medium for embedding the compacts, and also, when taking the compacts in and out from the powder medium, the surface of the compacts may be frequently scratched. Also, it is troublesome to completely remove the medium powder sticking to the surface of the compacts which have become fragile by the removal of binder, and it frequently takes time beyond expectation.

For producing sintered metallic materials by injection compacting, there are required various characteristics, e.g. a mixture of a metal powder and a binder having an excellent compatibility such as powder flowability or compacting stability, the obtained compacts having a high strength sufficient for handling, and the binder being easily removed from the compacts without causing cracking, blistering and deformation such as warpage. Accordingly, the selection of binders to be admixed with metallic powders is important.

As the organic binder used in compacting ceramic powders, there have been known, for instance, waxes and polymers such as ethylene-vinyl acetate copolymer (EVA), ethylene-ethyl acrylate copolymer (EEA), polystyrene, polyethylene, and acrylic and methacrylic polymers. These binders are also be applicable to the production of sintered metallic materials. However, these known binders have both merits and demerits and are not always satisfactory in required characteristics such as compatibility (e.g. compacting stability, mold releasing property and powder flowability in compacting inorganic powders to which the binders are added), strength of green compacts, removability of binder from green compacts by thermal decomposition prior to the sintering, shape retainability in thermal treatment for removal of binder and in sintering and amount of residual carbon.

For instance, ethylene-vinyl acetate copolymer (EVA) is superior in powder flowability and can provide green compacts having a high strength and an adequate elasticity without impairing the flowability when mixed with a metal powder. However, it is difficult to conduct the binder removal treatment without impairing the compacts when it is used in a large amount, because defects such as blister and cracks are easy to occur in removing the binder from compacts by thermal decomposition.

Similarly to EVA, the ethylene-ethyl acrylate copolymer (EEA) can also provide a high strength and an adequate elasticity to compacts without impairing the flowability when mixed with metallic powders. However, if it is used in a large quantity, blisters and cracks are markedly produced in the compacts when removing the binder by thermal decomposition. Thus it is difficult to remove the binder without impairing the compacts.

Also, polystyrene, and acrylic and methacrylic polymers (e.g. polyisobutyl methacrylate) have an excellent binding effect on metallic powders and impart a high strength to green compacts. In particular, they are effective for preventing damages of thin portions, thus imparting an excellent shape retainability to green compacts. They are also superior in thermal decomposability and are easy to be removed from the compacts. However, when they are used in a large quantity, mixtures with metallic powders are insufficient in flowability, and are easy to invite poor results in injection molding such as shortage of filling and weld line.

In order to obtain a binder having satisfactory properties, it is desirable to use these binders in combination by combining two or more of binders having different characteristics in a good balance. However, a difficulty is encountered in obtaining a homogeneous mixture by mixing such known binders, or a long time is required for the mixing, because they differ from each other in form and softening point and also because the solubility or compatibility is not satisfactory. In general, if the mixing of two or more binders is not so sufficient as to provide a homogeneous mixture, it takes a longer time to determine the compacting conditions since the flowability of the mixture is not stabilized. Also, since the uniformity of obtained compacts is impaired, the use of nonuniform binder mixture may cause cracking of sintered bodies in addition to influence on dimensional stability of compacts.

It is an object of the present invention to provide a metal powder composition which is suitable for the preparation of sintered bodies of metal powders by injection molding followed by sintering of compacts, and which can provide sintered bodies of complicated shape having a high density and no defects such as warpage, cracks and sink marks in high yields on a mass-productive industrial scale.

Another object of the present invention is to provide a sintered body of a metallic powder having no defects.

A still another object of the present invention is to provide a process for preparing a sintered metallic body wherein the removal of binder from compacts is conducted without using a powder medium.

These and other objects of the present invention will become apparent from the description hereinafter.

SUMMARY OF THE INVENTION

In accordance with the present invention, there is provided an injection compacting composition suitable for preparing sintered bodies of metal powders which comprises a metal powder and an organic binder, said organic binder comprising a composite acrylic polymer and an atactic polypropylene, and said composite acrylic polymer being a suspension polymerization product prepared by dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer, dispersing the resulting solution in an aqueous medium in the presence of a dispersing agent, and subjecting the resulting dispersion to a suspension polymerization.

Sintered metallic materials can be easily prepared from the injection compacting composition, for example, by injection-compacting the composition, heating the resulting compact at a rate of 3° to 300° C./hour to a temperature of 450° to 600° C., thereby removing binder from the compact, and sintering the compact.

DESCRIPTION OF THE DRAWINGS

FIGS. 1 to 4 are microphotographs of acrylic polymers treated by etching with a solvent so as to reveal the inner structure of the polymer particles, observed by a scanning electron microscope of 5,000 magnifications, wherein FIGS. 1 and 3 show microphotographs of composite acrylic polymers prepared according to the present invention, and FIGS. 2 and 4 show microphotographs of polymer blends prepared by blending two or more polymers;

DETAILED DESCRIPTION

Figure 1:
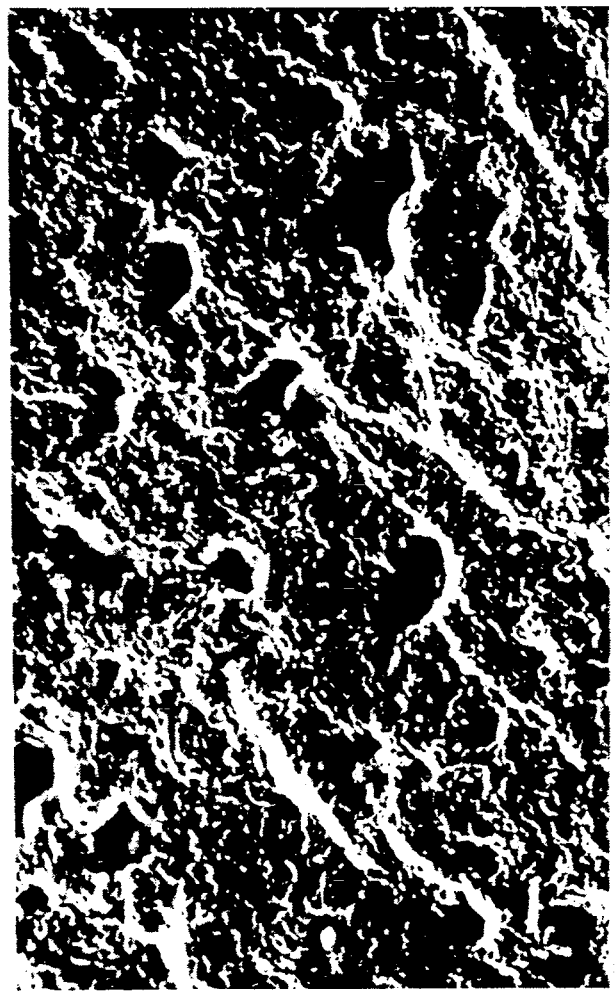

The metal powders used with the specific organic binder for preparing the injection compacting composition of the present invention are not particularly limited so long as they are metal powders which have been used for the purposes of sintered bodies. In particular, metal powders having a spherical particle form or a form near sphere and having an average particle size of about 1 to about 50 $\mu$m, especially about 1 to about 12 $\mu$m, are preferred. When the average particle size is less than 1 $\mu$m, the specific surface area of the powder increases relatively. The powder having a large specific surface area is hard to provide a compacting composition having a flowability adequate for injection compacting even if the amount of binder used is increased. Also, even if injection compacting is possible, it is difficult to smoothly practice the binder removal and the compacts after the removal of binder has a tendency to become fragile and difficult to handle. When the average particle size is more than 50 $\mu$m, such coarse metallic particles tend to remarkably lower the strength of compacts after the removal of binder. Representative examples of the metal powder are, for instance, pure iron, an iron alloy such as iron-nickel alloy, iron-cobalt alloy or stainless steel, tungsten, an aluminum alloy, copper or a copper alloy, and the like. The metal powders used in the present invention are not limited to these exemplified powders.

The organic binder used in the present invention comprises at least two components, namely the composite acrylic polymer and an atactic polypropylene. The above mixed organic binder may also contain additives, e.g. a plasticizer such as a phthalic acid ester for imparting a plasticity to the organic binder, waxes for improving the flowability, a lubricant or mold releasing agent such as a higher fatty acid, a surface active agent for improving the wettability of the surface of metal powders, and a surface treating agent (coupling agent).

The composite acrylic polymer, atactic polypropylene and optionally additives may be previously admixed to form the organic binder and be added to the metal powder, or they may be individually added to the metal powder.

The composite acrylic polymer has an excellent uniform structure as compared with a polymer blend. It is superior in the flowability of the compacting composition and the removability from green compacts, and has an excellent effect of binding metal particles. It is used for the purpose of imparting a sufficient flowability to the obtained composition and imparting sufficient strength and elasticity to the green compacts obtained from the composition.

The composite acrylic polymer is prepared by dissolving the polymer component (a), i.e. an ethylene-vinyl acetate copolymer and/or an ethylene-ethyl acrylate copolymer, and a polymerization initiator in the monomer component (b), i.e. an acrylic or methacrylic acid ester alone or a mixture of an acrylic or methacrylic acid ester and styrene, dispersing the resulting solution in an aqueous medium containing a dispersing agent, and subjecting the resulting dispersion to a suspension polymerization. A chain transfer agent may be used as occasion demands, and it is added to the above-mentioned solution.

Figure 2:
Figure 3:

Since the composite acrylic polymer is prepared by previously dissolving EVA and/or EEA in the monomer component and then dispersing the resulting solution in an aqueous medium followed by suspension polymerization, it is in the state like a sort of a polymer alloy wherein the polymer formed from the monomer component (b) is very uniformly dispersed in the polymer component (a), as observed in FIGS. 1 and 3 which are microphotographs of composite acrylic polymer particles prepared according to the present invention and etched with a solvent to reveal the inner structure of the particles. The composite acrylic polymer has the advantages that the conditions for compacting the composition can be determined more easily as compared with the use of a mere blend of the polymers (cf. FIGS. 2 and 4) and the flowability of the composition is stabilized and, therefore, good sintered bodies can be obtained in high yields with a little scatter.

The ethylene-vinyl acetate copolymers (EVA) used in the present invention are not particularly limited, and any of commercially available ethylele-vinyl acetate copolymers can be used. Copolymers of ethylene and vinyl acetate in a ratio of 85/15 to 50/50 by weight, especially 80/20 to 60/40 by weight, are particularly preferred, since if the ratio is more than 85/15 by weight, it becomes hard to dissolve in the monomer component (b), and since if the ratio is less than 50/50 by weight, such copolymers are available with difficulty and also there is a tendency to lower the strength of green compacts. From the viewpoint of the viscosity of the solution of the copolymers dissolved in the monomer component (b), it is preferable that the ethylene-vinyl acetate copolymers are those having a melt index of about 10 to about 500. From the viewpoints of the powder flowability required in compacting and the strength of green compacts, it is more preferable that the copolymers are those having a melt index of about 20 to about 400.

The ethylene-ethyl acrylate copolymers (EEA) used in the present invention are not particularly limited, and any of commercially available ethylene-ethyl acrylate copolymers can be used. Copolymers of ethylene and ethyl acrylate in a ratio of 85/15 to 50/50 by weight, especially 80/20 to 60/40 by weight, are preferred, since if the ratio is more than 85/15 by weight, it becomes hard to dissolve in the monomer component (b), and since if the ratio is less than 50/50 by weight such copolymers are available with difficulty and also there is a tendency to lower the strength of green compacts. From the viewpoint of the viscosity of the solution of the copolymers dissolved in the monomer component (b), it is preferable that the ethylene-ethyl acrylate copolymers are those having a melt index of about 10 to about 2,000. From the viewpoints of the powder flowability and the strength of green compacts, it is more preferable that the copolymers are those having a melt index of about 100 to about 1,500.

The acrylic and methacrylic acid esters used as the monomer component (b) are not particularly limited, but from the viewpoints of powder flowability in compacting, strength of green compacts and binder removability, esters of acrylic or methacrylic acid with an alcohol having 1 to 8 carbon atoms are preferred. Examples of the (meth)acrylic acid ester are, for instance, n-alkyl (meth)acrylates having a $C_1$ to $C_8$ alkyl group, isopropyl (meth)acrylate, isobutyl (meth)acrylate, t-butyl (meth)acrylate, 2-ethylhexyl (meth)-acrylate, 2-methoxyethyl (meth)acrylate, 2-ethoxyethyl (meth)acry-late, and the like. Among them, n-alkyl (meth)acrylates having a $C_1$ to $C_4$ alkyl group, isopropyl (meth)acrylate and isobutyl (meth)acrylate are particularly preferred. The (meth)acrylic acid esters may be used alone or in admixture thereof.

The (meth)acrylic acid esters can be used in admixture with a styrene compound. Representative examples of the styrene compound are, for instance, styrene, α-methylstyrene, p-methylstyrene and vinyl styrene. Preferably, the content of the styrene compound in a mixture of the (meth)acrylic acid ester and the styrene compound is not more than 80% by weight. The flowability of the obtained binder decreases with increasing the amount of styrene compound, thus the use of the styrene compound in a higher proportion tends to lower the compactibility.

Other monomers, e.g. acrylic acid, methacrylic acid, vinyl acetate and vinyl chloride, may be used in a small amount as the component (b) so long as the desired properties of the obtained polymer used as the binder are not substantially impaired.

The polymer component (a) and the monomer component (b) are used in an (a)/(b) ratio of about 5/95 to about 80/20 by weight, preferably about 20/80 to about 70/30 by weight. When the (a)/(b) ratio is less than 5/95 by weight, the powder flowability in compacting is apt to be insufficient. Insufficient flowability is easy to cause bad compacting. When the (a)/(b) ratio is more than 80/20 by weight, blistering may occur when the binder is removed by thermal decomposition, thus resulting in lowering of the strength of sintered body, and also the binder removal and the handling become difficult.

It is preferable to use an oil-soluble polymerization initiator so that the polymerization proceeds in oil droplets dispersed in the aqueous medium, thus polymer particles wherein the polymer component (a) and the polymer formed from the monomer component (b) are uniformly blended, are produced. Representative examples of the polymerization initiator are, for instance, an organic peroxide such as benzoyl peroxide, lauroyl peroxide or t-butyl-peroxy-2-ethylhexanate, an azo compound such as azoisobutylonitrile or azobisdimethyl-valeronitrile, and other oil-soluble polymerization initiators. The initiators may be used alone or in admixture thereof. The amount of the initiator is from 0.05 to 1.5 parts by weight, preferably 0.1 to 0.6 part by weight, per 100 parts by weight of the monomer component (b).

Representative examples of the chain transfer agent which may be used in the polymerization in order to control the molecular weight are, for instance, a mercaptan such as dodecylmercaptan or t-octylmercaptan, α-methylstyrene, and a dimer of α-methylstyrene. The chain transfer agents may be used alone or in admixture thereof. The amount of the chain transfer agent is from 0.01 to 1.0 part by weight, preferably 0.03 to 0.5 part by weight, per 100 parts by weight of the monomer component (b).

It is desirable that the polymer component (a) is completely dissolved in the monomer component (b) so that the reaction proceeds uniformly, thus producing a polymer having a uniform composition. The manner of the dissolution is not particularly restricted. When a polymerization initiator is dissolved, the dissolution should be conducted at a temperature lower than the decomposition temperature of the initiator. The solution is dispersed in an aqueous medium in the presence of a dispersing agent, and the resulting suspension is subjected to a suspension polymerization.

Known dispersing agents can be used in the present invention. Representative examples of the dispersing agent are, for instance, a water-soluble organic high molecular weight compound such as polyvinyl alcohol, hydroxyethyl cellulose or polyvinylpyrrolidone, and a combination of an anionic surface active agent and a fine powder of a slightly water-soluble inorganic compound such as hydroxyapatite or magnesium pyrophosphate. The dispersing agent is used in an amount of 0.1 to 1 part by weight, preferably 0.2 to 0.5 part by weight, per 100 parts by weight of the aqueous medium.

The solution of the polymer component (a) and the initiator in the monomer component (b), which may further contain a chain transfer agent, is dispersed in an aqueous medium, e.g. water, in an amount of 30 to 120 parts by weight, preferably 50 to 100 parts by weight, per 100 parts by weight of the aqueous medium.

The conditions and the like for the suspension polymerization are not particularly limited, thus the suspension polymerization can be conducted in a usual manner. The polymerization temperature is determined according to the decomposition temperature of the polymerization initiator used. The polymerization is usually carried out at a temperature of 50° to 130° C. for 2 to 10 hours.

The thus obtained product of the suspension polymerization is a composite polymer wherein the polymer formed from the monomer component (b) is uniformly dispersed in the polymer component (a), as observed in FIGS. 1 and 3 which are microphotographs of polymer particles prepared according to the present invention and etched with a solvent to reveal the inner structure of the particles.

The composite polymer prepared according to the present invention is useful as a binder for the preparation of sintered bodies of metal powders, and has the advantages as mentioned above. In the present invention, the composite acrylic polymer is used in combination with an atactic polypropylene, in order to improve the shape retainability of compacts in the step of removing the binder from the compacts by thermal decomposition. Accordingly, the deformation of the compacts in the binder removing step can be remarkably decreased by the combination use of the composite acrylic polymer and atactic polypropylene.

The proportion of the composite acrylic polymer in the organic binder used in the present invention is usually from 20 to 80% by weight, preferably 35 to 65% by weight, based on the weight of the organic binder. When the proportion of the composite acrylic polymer is less than 20% by weight, the strength of compacts prepared from the composition of the invention is insufficient, and accordingly a difficulty is encountered in taking out the compact from a mold. It is also difficult to handle the compact. When the proportion is more than 80% by weight, mixing of a metal powder and the binder requires a long time due to lack of the wettability. Also, there is a tendency to be lacking in flowability of the obtained composition.

Any of atactic polypropylene (APP) polymers can be used in the present invention. Atactic polypropylene having a softening point of at most 110° C. is preferable from the viewpoint of the flowability of the mixture of a metal powder and the binder.

The proportion of the atactic polypropylene in the organic binder used in the present invention is usually from 8 to 50% by weight, preferably from 12 to 35% by weight, based on the weight of the organic binder. When the proportion of the atactic polypropylene is less than 8% by weight, the desired effects mentioned above are not sufficiently exhibited. When the proportion is more than 50% by weight, the fatal defect of the atactic polypropylene, namely poor mold releasing property, markedly appears and, therefore, green compacts are released from a mold with difficulty, thus decreasing the compacting efficiency. Also, there is a tendency to decrease the strength of compacts.

The organic binder may contain waxes or other additives such as a plasticizer, a lubricant, a surfactant, etc., as occasion demands. Both the natural waxes and the synthetic waxes can be used in the present invention. Examples of the wax are, for instance, paraffin waxes, microcrystalline wax, carnauba wax, montan wax, and the like. Examples of the plasticizer are, for instance, a phthalate such as dibutyl phthalate or octyl phthalate, a phosphate, a fatty acid ester, and the like. Examples of the lubricant are, for instance, a higher fatty acid, a higher fatty acid amide, a higher fatty acid ester, a higher fatty acid salt. Additives which have been usually used for injection compacting of ceramic powders can be used without any restriction. The total content of these optional components in the organic binder is preferably at most 50% by weight from the viewpoints of the strength of compacts and the shape retainability of compacts in removal of the binder.

The ratio of the metal powder to the organic binder which contains the composite acrylic polymer and the atactic polypropylene as the essential components, is preferably from 100/4 to 100/15 by weight. When the weight ratio is more than 100/4, the injection compacting composition is lacking in flowability, thus formation into a desired shape is apt to be difficult. When the weight ratio is less than 100/15, the density of the obtained compacts is low and, therefore, the sintered compacts are poor in dimensional accuracy due to large shrinkage in sintering and also defects such as cracks and blister are produced in the compacts due to generation of a gas in removal of the binder by thermal decomposition.

The preparation of sintered metallic materials from the injection compacting composition of the present invention is conducted usually according to the following method, but is not limited thereto. Firstly, a metal powder is kneaded sufficiently with the organic binder under heating by a kneader such as a pressure kneader to disperse uniformly the metal powder into the organic binder. The resulting mixture is formed into an appropriate shape such as pellets or pulverized coarse particles to provide an injection compacting composition.

The composition is then injection-compacted into a desired shape using a known injection molding machine as used for usual plastic molding by a known method. The organic binder is then removed from the obtained compacts by thermal decomposition or other methods, and the sintering is carried out in an appropriate atmosphere at an appropriate temperature to give sintered bodies having a desired shape.

Preferably, the removal of the binder is carried out by placing the compacts in a non-oxidizing atmosphere, e.g. a reducing atmosphere such as hydrogen gas or an inert gas atmosphere such as helium, argon or nitrogen gas, and heating at a temperature elevation rate of 3° to 300° C./hour to a temperature of 450° to 600° C. The temperature may be elevated at a constant rate or stepwise.

The temperature elevation rate varies depending on the shape of compacts, the thickness of compacts, and other factors, and is suitably selected from the above range. It is general to conduct the binder removing treatment under such conditions that the treatment is completed in the shortest time, but when the temperature elevation rate is more than 300° C./hour, defects such as blister or cracks are produced in the compacts and it is difficult to carry out the treatment satisfactorily. On the other hand, when the temperature elevation rate is less than 3° C./hour, the treatment requires a too long time and is not practical. If the maximum temperature of the heating is lower than 450° C., the treatment may result in insufficient removal of binder when the compacts is thick. If the compacts are heated to over 600° C., deformation of the compacts may occur.

The organic binder containing the composite acrylic polymer and atactic polypropylene as the essential components has the advantages that the removal of the binder from compacts can be achieved by directly placing the compacts on a suitable plate such as an alumina plate and heating them with a simple temperature elevation pattern, without adopting a general method wherein the compacts are embedded in a powder such as alumina and heated, or other special methods for removing binder, and that even if the treated compacts are subsequently sintered, good sintered bodies having no defects are obtained. The organic binder according to the present invention has an excellent shape retention property and, therefore, it is effective particularly for compacts having a complicated shape, for example, compacts having a projecting long portion like a pin which require a very high shape retainability.

The removal of the binder from compacts may be carried out according to a conventional manner, for example, by embedding the compacts in a powder medium such as alumina powder and heating them.

The present invention is more specifically described and explained by means of the following Examples in which all % and parts are by weight unless otherwise noted. It is to be understood that the present invention is not limited to the Examples.

REFERENCE EXAMPLE 1

Preparation of Composite Acrylic Polymer

A 5 liter reactor was charged with 700 g of n-butyl methacrylate (BMA), 500 g of styrene and 0.35 g of n-dodecylmercaptan. To the reactor was added 300 g of an ethylene-vinyl acetate copolymer (EVA) (commercially available under the trade mark "Ultracen" 722 made by Tosoh Corporation) with stirring. The temperature was elevated to 75° C. and the EVA was dissolved in the monomer mixture, and 4.8 g of benzoyl peroxide and 0.25 g of t-butylperoxybenzoate were further dissolved therein. To the reactor was added an aqueous solution of a dispersing agent prepared from 1,840 ml of deionized water and 160 ml of a 3% aqueous solution of polyvinyl alcohol and heated at 80° C., and the content was stirred to form an aqueous suspension. After replacing the polymerization system with nitrogen gas, the polymerization was carried out at 80° C. for 5 hours and then at 110° C. for 2 hours. After cooling the reaction mixture, the produced polymer was taken out of the reactor, washed with water and dried to give white spherical particles, the particle size of which fell within the range of 0.3 to 1.0 mm. The produced polymer had an intrinsic viscosity $[\eta]$ of 0.70 (toluene solution at 30° C.). The thus obtained polymer is hereinafter referred to as "composite acrylic polymer (A)".

REFERENCE EXAMPLE 2

Preparation of Composite Acrylic Polymer

A 5 liter reactor was charged with 600 g of n-butyl methacrylate (BMA) and 0.3 g of n-dodecylmercaptan, and the temperature was elevated to 75° C. with stirring. To the reactor were added 900 g of an ethylene-vinyl acetate copolymer (EVA) (commercially available under the trade mark "Ultracen" 722 made by Tosoh Corporation) and 2.4 g of benzoyl peroxide as a polymerization initiator, and they were dissolved in BMA to form an EVA-BMA solution. An aqueous solution of a dispersing agent prepared from 1,840 ml of deionized water and 160 ml of 3% aqueous solution of polyvinyl alcohol was added to the reactor and stirred to suspend the EVA-BMA solution in the aqueous solution. After replacing the polymerization system with nitrogen gas, the polymerization was carried out at 80° C. for 3 hours and then at 100° C. for 2 hours. After cooling the reaction mixture, the produced polymer was taken out of the reactor, washed with water and dried.

The produced polymer was in the form of spherical particles, the particle size of which fell within the range of 0.3 to 1 mm, and had an intrinsic viscosity $[\eta]$ of 0.85 (toluene solution at 30° C.). The thus obtained polymer is hereinafter referred to as "composite acrylic polymer (B)".

REFERENCE EXAMPLES 3 AND 4

Preparation of Mixed Acrylic Polymers

The same EVA as used in Reference Example 1, polybutyl methacrylate having a molecular weight of 300,000 and polystyrene were blended by means of mixing rolls at 150° C. for 30 minutes to give a mixed acrylic polymer (A) having approximately the same composition and intrinsic viscosity as those of the composite polymer (A).

Further, the same EVA as used in Reference Example 2 and polybutyl methacrylate having a molecular weight of 300,000 were blended by means of mixing rolls at 140° C. for 30 minutes to give a mixed acrylic polymer (B) having approximately the same composition and intrinsic viscosity as those of the composite polymer (B).

Figure 4:

The suspension polymerization products obtained in Reference Examples 1 and 2 and the blends obtained in Reference Examples 3 and 4 were immersed in hexane for 2 minutes for solvent etching treatment in order to observe the inner structure thereof. The etched products and blends were observed by a scanning electron microscope at a magnification of X5,000. The microphotographs thereof are shown in FIGS. 1 to 4 wherein FIG. 1 is for the composite polymer (A) of Reference Example 1, FIG. 2 is for the mixed polymer A of Reference Example 3, FIG. 3 is for the composite polymer (B) of Reference Example 2 and FIG. 4 is for the mixed polymer (B) of Reference Example 2.

In FIGS. 1 and 2, it is observed that in the EVA-BMA-styrene suspension polymerization product of Reference Example 1 fine particles are uniformly dispersed in each other, and there is a marked difference in the state of dispersion between the product of Reference Example 1 and the blend of Reference Example 3. In FIGS. 3 and 4, a similar difference is also observed between the EVA-BMA suspension polymerization product of Reference Example 2 and the blend of Reference Example 4.

EXAMPLES 1 TO 6 AND COMPARATIVE EXAMPLES 1 TO 4

Using as metal powders a powder of JIS SUS 304L stainless steel having an average particle size of 8.9 $\mu$m, a powder of JIS SUS 316L stainless steel having an average particle size of 10.5 $\mu$m and a carbonyl iron powder having an average particle size of 12.0 $\mu$m, an organic binder having the composition shown in Table 1 was added to 100 parts of the metal powder. They were kneaded by a Laboplasto Mill (made by Toyo Seiki Kabushiki Kaisha) at a temperature of 140°±10° C. for 30 minutes.

Figure 5:
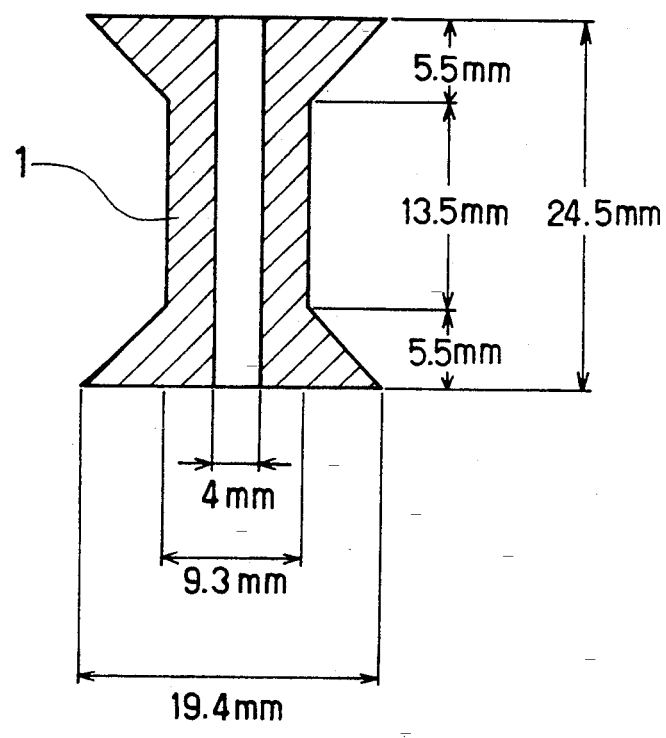
FIG. 5 is a section view showing a bobbin-shaped compact prepared in the Examples and Comparative Examples described after.
Figure 6A:
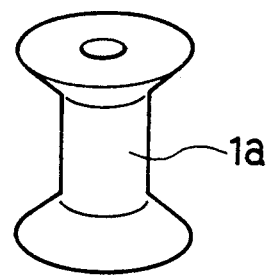
FIGS. 6A to 6D are illustrative views showing the state of compacts treated thermally for removing a binder from the compacts.
Figure 6B:
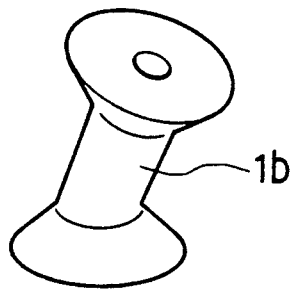
Figure 6C:
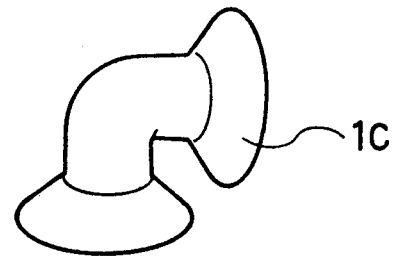
Figure 6D:

The obtained mixture was ground to particles having a particle size of 3 to 5 mm, and formed into bobbin-shaped compacts shown in FIG. 5 by an injection molding machine (vertical plunger type injection molding machine made by Yamashiro Seiki Kabushiki Kaisha) at an injection temperature of 120° to 170° C. at an injection pressure of 500 to 700 kg/cm$^2$. The compacts were directly placed on an alumina plate without embedding in a powder such as alumina, and were heated in a nitrogen atmosphere at a rate of 10° C./hour from room temperature to 500° C. to remove the binder from the compacts. The compacts were subsequently sintered under the conditions shown in Table 2 to give sintered metallic materials.

After the thermal treatment for removing the binder, the state of the treated 40 compacts were observed and classified into 4 standard states shown in FIGS. 6A to 6D wherein compact 1a showed a good compact having no defects, compact 1b showed a compact inclined slightly, compact 1c showed a compact bent approximately at right angles, and compact 1d showed a compact crushed flat. The results are shown in Table 2.

The theoretical density percentage and appearance of the obtained sintered metallic materials are also shown in Table 2.

TABLE 1

| | Metal powder | | Organic binder (part) | | | | | | | |
|---|---|---|---|---|---|---|---|---|---|---|
| | Kind | Amount (part) | Composite polymer A | Composite polymer B | Atactic PP*[1] | Paraffin wax*[2] | Micro-crystalline wax*[3] | Stearic acid | Dibutyl phthalate | Total Amount |
| Ex. 1 | SUS 304 L | 100 | 5 | — | 2.5 | 2.5 | — | — | 1 | 11 |
| Ex. 2 | SUS 304 L | 100 | 4.8 | — | 2.38 | 2.37 | — | — | 0.95 | 10.5 |
| Ex. 3 | SUS 304 L | 100 | 5 | — | 1.5 | 3.5 | — | — | 1 | 11 |
| Ex. 4 | SUS 316 L | 100 | — | 5 | 2.5 | — | 2.5 | — | 1 | 11 |
| Ex. 5 | Carbonyl iron | 100 | 3.6 | — | 2.1 | — | 1.6 | — | 0.7 | 8 |
| Ex. 6 | Carbonyl iron | 100 | — | 3.6 | 2.6 | 1.1 | — | — | 0.7 | 8 |
| Com. Ex. 1 | SUS 304 L | 100 | — | 6.9 | — | — | 2.2 | 1.9 | — | 11 |
| Com. Ex. 2 | SUS 304 L | 100 | 7.1 | — | — | 1 | — | 2 | 0.9 | 11 |
| Com. Ex. 3 | SUS 316 L | 100 | — | — | 6.25 | 3.75 | — | — | 1 | 11 |
| Com. Ex. 4 | Carbonyl iron | 100 | 4.2 | — | — | — | 3.1 | — | 0.7 | 8 |

(Notes)
*[1] Atactic polypropylene commercially available under the trade mark "EASTOBOND M-500S" made by Eastman Chemical Company.
*[2] Paraffin wax having a melting point of 69° C.
*[3] Microcrystalline wax having a melting point of 84° C.

TABLE 2

| | State of compacts after removing binder (number of compacts) | | | | Sintering condition | | | Theoretical density percentage | Appearance |
|---|---|---|---|---|---|---|---|---|---|
| | Good compact | Compact inclinded | Compact bent at about 90° | Compact crushed | Atmosphere | Maximum temperature (°C.) | Time (min.) | | |
| Ex. 1 | 40 | 0 | 0 | 0 | N$_2$ | 1350 | 120 | 94 | Very good, no cracks |
| Ex. 2 | 40 | 0 | 0 | 0 | vacuum | 1350 | 60 | 96 | Very good, no cracks |
| Ex. 3 | 40 | 0 | 0 | 0 | vacuum | 1350 | 60 | 96 | Very good, no cracks |
| Ex. 4 | 40 | 0 | 0 | 0 | vacuum | 1250 | 60 | 95 | Very good, no cracks |
| Ex. 5 | 40 | 0 | 0 | 0 | vacuum | 1200 | 60 | 95 | Very good, no cracks |
| Ex. 6 | 40 | 0 | 0 | 0 | vacuum | 1200 | 60 | 95 | Very good, no cracks |

TABLE 2-continued

|  | State of compacts after removing binder (number of compacts) | | | | Sintering condition | | | |
|---|---|---|---|---|---|---|---|---|
|  | Good compact | Compact inclined | Compact bent at about 90° | Compact crushed | Atmosphere | Maximum temperature (°C.) | Time (min.) | Theoretical density percentage | Appearance |
| Com. Ex. 1 | 0 | 33 | 7 | 0 | Sintering was not made because no good compacts were obtained. | | | | |
| Com. Ex. 2 | 0 | 36 | 4 | 0 | " | | | | |
| Com. Ex. 3 | 0 | 0 | 38 | 2 | " | | | | |
| Com. Ex. 4 | 0 | 35 | 5 | 0 | " | | | | |

From the results shown in Table 2, it is understood that the metal powder composition containing the specific organic binder according to the present invention provides, by injection molding, compacts which can withstand a thermal treatment to remove the binder with a high shape retention and without causing defects such as cracks and deformation, thus provides sintered metallic materials having no defects and a high theoretical density percentage.

In addition to the ingredients used in the Examples, other ingredients can be used in the Examples as set forth in the specification to obtain substantially the same results.

What we claim is:

1. An injection compacting composition suitable for preparing sintered bodies of metal powders which comprises a metal powder and an organic binder, said organic binder comprising a composite acrylic polymer and an atactic polypropylene, and said composite acrylic polymer being a suspension polymerization product prepared by dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer, dispersing the resulting solution in an aqueous medium in the presence of a dispersing agent, and subjecting the resulting dispersion to a suspension polymerization.

2. The composition of claim 1, wherein the ratio of the metal powder to the organic binder is from 100/4 to 100/15 by weight.

3. The composition of claim 1, wherein the organic binder contains 20 to 80% by weight of the composite acrylic polymer and 8 to 50% by weight of the atactic polypropylene.

4. The composition of claim 1, wherein the organic binder contains at most 50% by weight of an additive selected from the group consisting of a wax, a plasticizer and a lubricant.

5. The composition of claim 1, wherein the solution of the component (a) dissolved in the component (b) contains an oil-soluble polymerization initiator.

6. The composition of claim 1, wherein the solution of the component (a) dissolved in the component (b) contains a chain transfer agent.

7. The composition of claim 1, wherein the polymer component (a) and the monomer component (b) are used in an (a)/(b) ratio of 5/95 to 80/20 by weight.

8. A sintered body prepared by compacting the composition of claim 1 and sintering the resulting compact.

9. A process for preparing a sintered body of a metal powder which comprises injection-compacting the composition of claim 1, heating the resulting compact in a non-oxidizing atmosphere at a rate of 3° to 300° C./hour to a temperature of 450° to 600° C. to remove the binder, and sintering the compact.

* * * * *